United States Patent [19]

Unrau

[11] Patent Number: 5,421,392
[45] Date of Patent: Jun. 6, 1995

[54] TIRE BEAD BREAKER

[76] Inventor: Erdman Unrau, Box 617, Ile Des Chenes, Manitoba, Canada, R0A 0T0

[21] Appl. No.: 193,529
[22] Filed: Feb. 8, 1994

[30] Foreign Application Priority Data

Feb. 18, 1993 [CA] Canada .................................. 2089844

[51] Int. Cl.6 .............................................. B60C 25/06
[52] U.S. Cl. ..................................... 157/1.17; 157/1.1
[58] Field of Search ................................ 157/1.1, 1.87

[56] References Cited

U.S. PATENT DOCUMENTS

| | | |
|---|---|---|
| 2,684,710 | 7/1952 | Calvin . |
| 3,253,640 | 5/1966 | Paulauskas . |
| 3,648,751 | 3/1972 | Archidoit . |
| 3,707,179 | 12/1972 | Le Pier . |
| 4,524,813 | 6/1985 | Gering ................................ 157/1.17 |
| 4,785,865 | 11/1988 | Folstad . |
| 4,850,413 | 7/1989 | Blank . |

*Primary Examiner*—James G. Smith
*Attorney, Agent, or Firm*—Murray E. Thrift; Adrian D. Battison; Stanley G. Ade

[57] ABSTRACT

A tire bead breaker is used for a pneumatic tire mounted on a wheel. The breaker has an elongate main body that extends from the tire rim where the bead is to be broken across the center of the wheel. Two rim engaging hooks at the end of the main body engage under the wheel rim and are held in place using a retainer plate that engages the inside of the rim and is itself retained in place using a keeper mounted on the main body. The bead is dislodged using a push rod with a curved, spatulate head that engages the side wall of the tire and is driven against the tire side wall using a bolt threaded into the end of a sleeve in which the push rod slides.

11 Claims, 3 Drawing Sheets

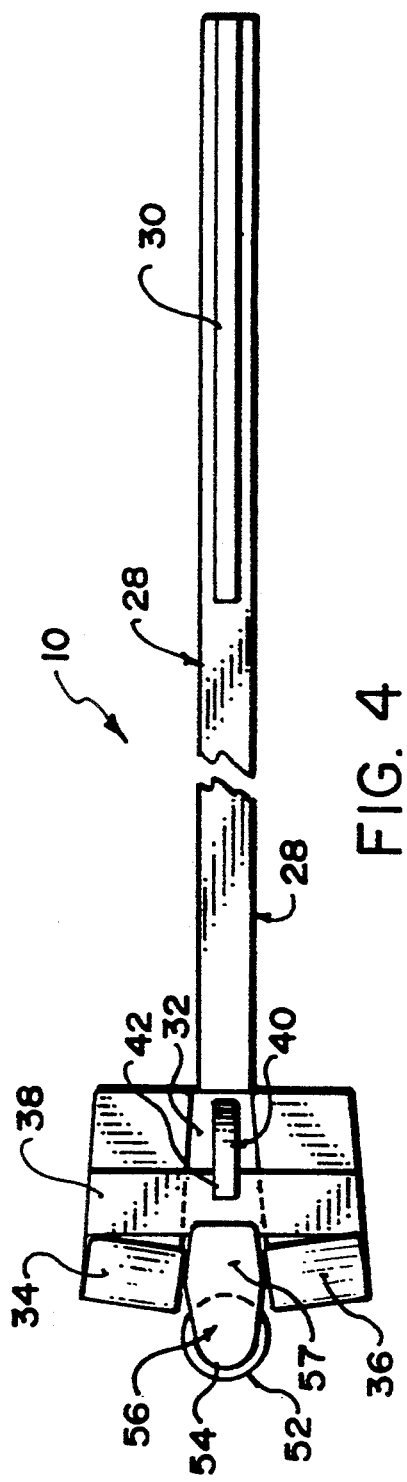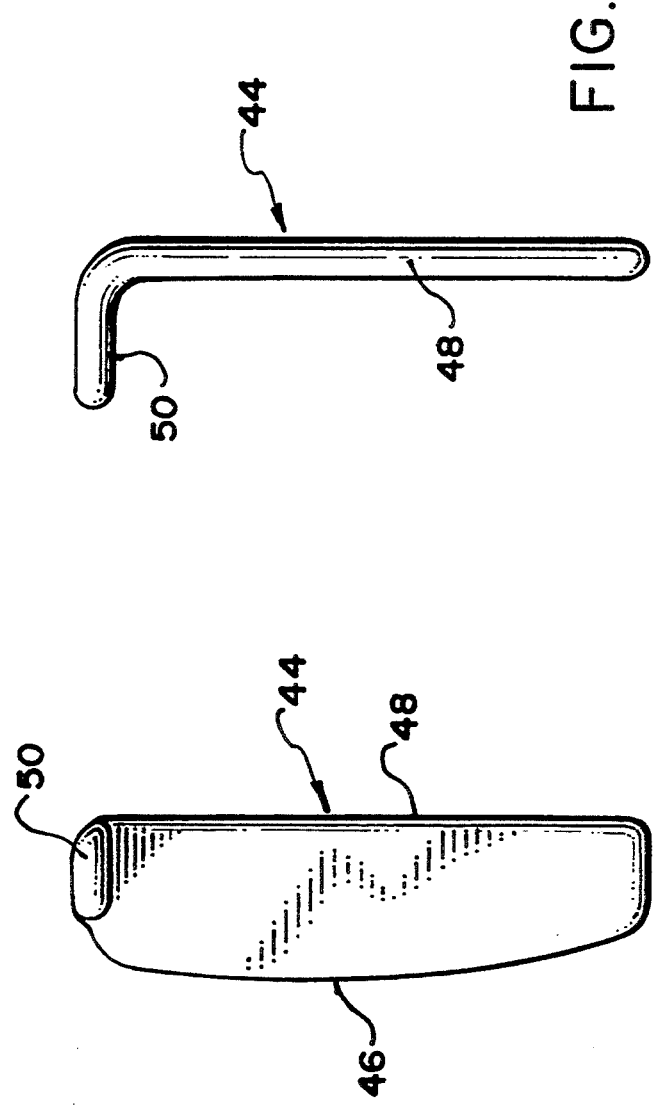
FIG. 4
FIG. 5
FIG. 6

TIRE BEAD BREAKER

FIELD OF THE INVENTION

The present invention relates to tire bead breakers and more particularly to a manual bead breaker for pneumatic tires.

BACKGROUND

Modern pneumatic tires, especially tubeless tires, are usually mounted on wheels with rims that capture the tire bead to ensure maintenance of the desired airtight seal between the tire and the wheel rim. In order to break the seal between the tire bead and the rim, it is usual to use a power operated bead breaker capable of exerting sufficient force on the tire side wall to dislodge the bead from the rim. In many cases, however, a tire will need repairs in a field situation far from the nearest power operated tire changing equipment. For example, where a tire on a farm truck or a tractor fails in the field, removing the wheel to the nearest tire repair equipment causes considerable non-productive down time. To solve this problem, various manually operated devices have been proposed to permit the ready removal of tires from rims. These include the devices disclosed in the following:

U.S. Pat. No. 2,684,710 to Calvin describes a tool which is fastened to a wheel using a hook that engages the center hub opening of the wheel and a hook shaped head that engages the wheel rim. The device is tightened in place using a nut threaded onto the shank of the hob hook. A pusher head slides in a socket in the head and is driven against the tire side wall with a bolt in order to dislodge the tire bead from the rim. The mounting system used in this device does not provide a positive securement of the device to the wheel rim where the bead is to be broken. Over tightening of the hub engaging hook may well bend the wheel, especially in the critical rim area.

U.S. Pat. No. 4,785,865 to Folstad describes a device that has a screw operated clamp that is intended to clamp directly onto the rim where the bead is to be broken. The very large forces required to unseat the tire bead will tend to rotate this tool around the rim, applying a bending moment to the rim.

U.S. Pat. No. 3,707,179 to LePier discloses another tool with a screw operated clamp that clamps directly onto the rim of the wheel.

U.S. Pat. No. 3,253,640 to Paulauskas discloses a device that clamps onto a wheel rim to provide a moveable fulcrum for a tire iron.

U.S. Pat. No. 3,648,751 to Archidoit discloses a device that clamps onto the rim and has a backup wing head bolt engaging the wheel centre flange to resist movements from the pusher head. This device is power operated.

U.S. Pat. No. 4,850,413 to Blank describes a bead breaker in which a tire iron and a rim hook are two parallel plates that are pivotally connected at a position spaced outwardly from the tire tread.

SUMMARY

According to the present invention there is provided a tire bead breaker for a pneumatic tire mounted on a wheel having a rim and a center flange, the breaker comprising:

a main body having a center flange engaging part and an operating part spaced therefrom;

rim hook means secured to the operating part of the main body and projecting therefrom for engagement with an edge of the wheel rim;

retainer seat means secured to the main body and confronting the rim hook means;

retainer plate means engageable with the retainer seat means, between the retainer seat means and the rim hook means for retaining the wheel rim edge in engagement with the rim hook means;

push rod means mounted slideably on the main body for movement into engagement with a side wall of the tire adjacent the rim hook means; and push rod advancing means for advancing the push rod into forcible engagement with the tire side wall to push the side wall away from the wheel rim.

The rim hooks are thus positively locked to the rim by the retainer plate. No screw clamping forces are exerted on the rim. Bending movements on the rim are resisted by the support of the main body of the breaker on the wheel centre flange.

BRIEF DESCRIPTION OF THE DRAWINGS

In the accompanying drawings, which illustrate an exemplary embodiment of the present invention:

FIG. 4 is a bottom view of the tool;

FIG. 5 is a plan view of the retainer plate; and

FIG. 6 is a side view of the retainer plate.

DETAILED DESCRIPTION

Figure 1:
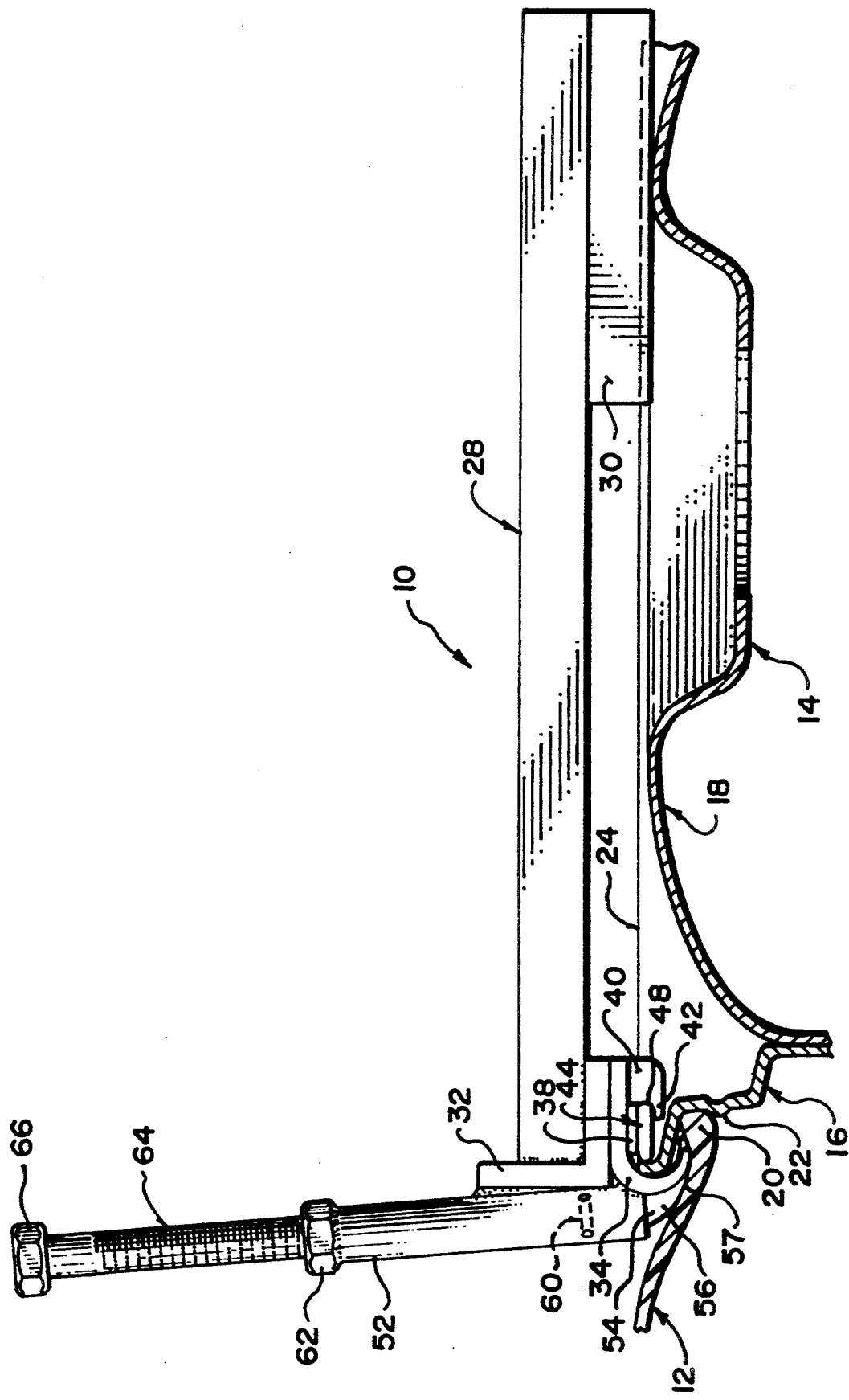
FIG. 1 is a side elevation showing a bead breaker according to the present invention applied to a wheel mounted tire, the tire and wheel being shown in part and in cross section.

Referring to the accompanying drawings, there is illustrated a bead breaker 10 for use with a pneumatic tire 12 mounted on a wheel 14 having a rim 16 and centre flange 18. As is conventional, the tire has a bead 20 that engages inside the rim of the wheel and forms an airtight seal with the wheel. As illustrated most particularly in FIG. 1, the wheel rim contains an internal rib 22 that serves as a bead retainer retaining the bead 20 against the outer side flange 24 of the wheel rim.

The bead breaker 10 has an elongate main body 28 in the form of an elongate bar with a length greater than one-half the diameter of the wheel 14. A support plate 30 is secured to the underside of the main body 28 at the outer end of the main body to engage the centre flange 18 of the wheel. At the opposite end of the main body is a transverse angle 32 which carries two rim hooks 34 and 36 that are spaced apart and converge towards the end of the main body. Each end hook is relatively wide and has a channel shape with the open side facing towards the support 30. A spacer plate 38 extends across the base of the hooks 34 and 36.

Between the hooks is a retainer keeper 40 in the form of vertically oriented plate having a finger 42 below the spacer plate 38 and extending towards the rim hooks 34 and 36. As illustrated most particularly in FIGS. 1 and 2, this defines a retainer seat facing the rim hooks. A retainer plate 44 may be inserted between the seat and the hooks from the side. The retainer plate has a concave leading edge 46 and a straight back edge 48 that engages with the seat. A finger grip 50 projects upwardly from one end of the retainer plate as illustrated most particularly in FIGS. 5 and 6.

At the end of the main body 22, secured to the outer face of the angle 32 is a push rod sleeve 52. This is inclined slightly downwardly towards to the tire and rim. A push rod 54 slides in the sleeve 52. It has a curved, spatulate tire engaging head 56 with a convex leading face 57 that engages the tire side wall as illustrated most particularly in FIG. 1. One side of the push rod 54 is formed with a flat 58 that engages a rollpin 60 extending through the tube to keep the push rod in the desired orientation.

A nut 62 is secured to the top end of the sleeve 52. A bolt 64 is threaded into the nut and engages the top end of the push rod 54 within the push rod sleeve. The bolt has a conventional hex head 66 that may be rotated using a wrench to drive the push rod downwardly in the push rod sleeve.

Figure 2:
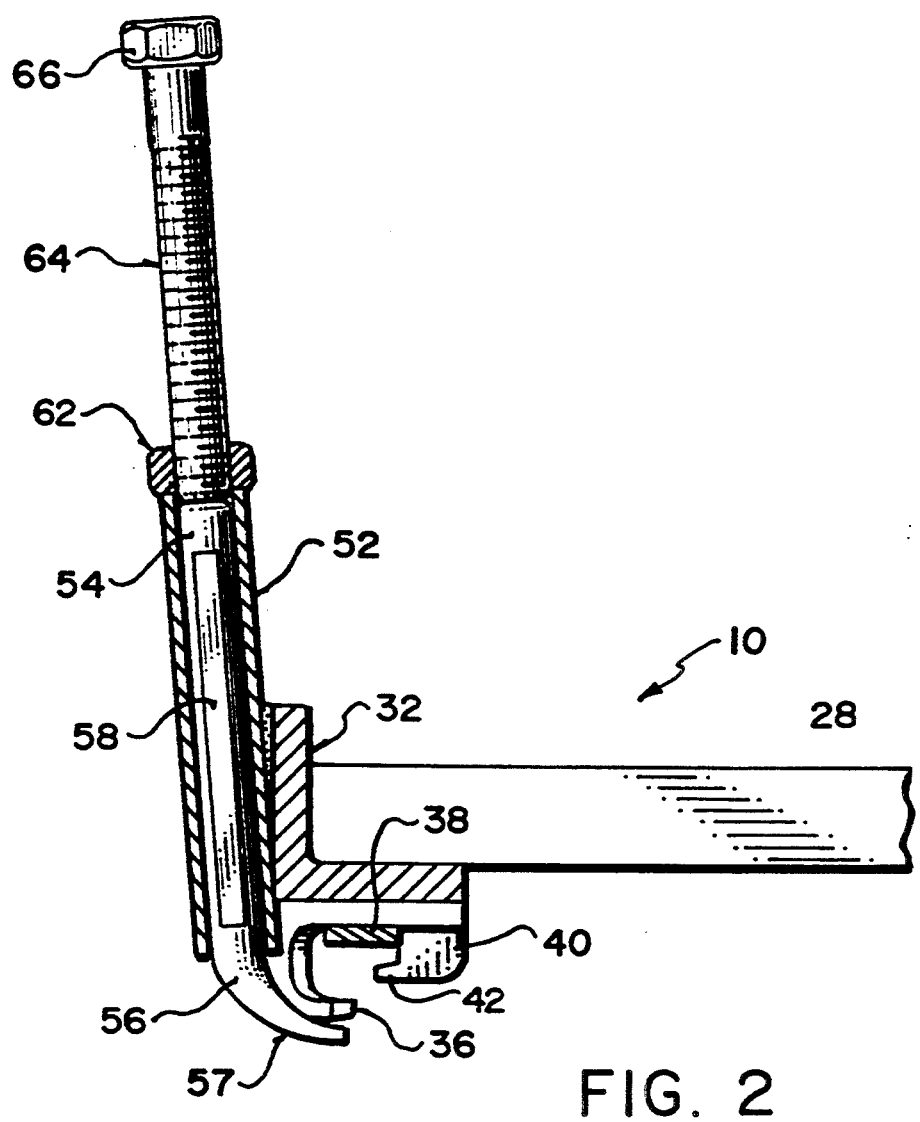
FIG. 2 is a partial cross section of the rim end of the tool with the retainer plate removed.
Figure 3:
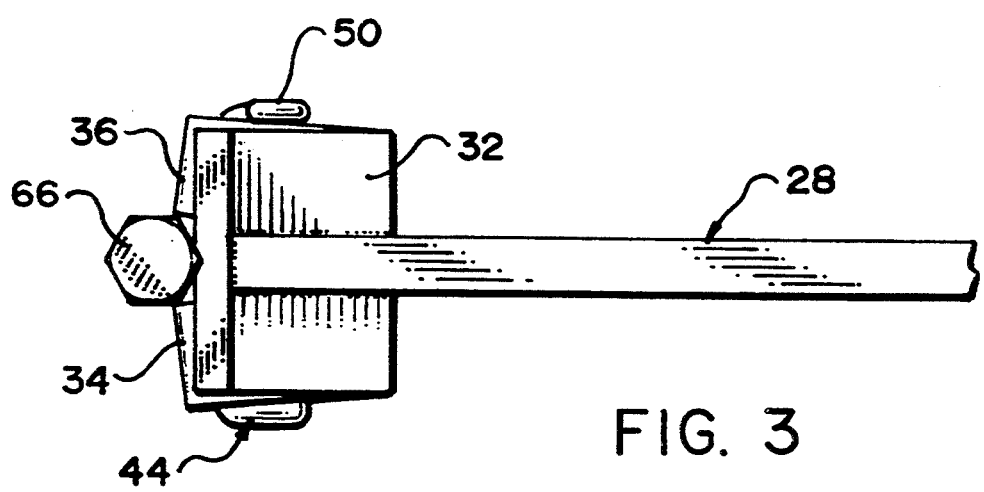
FIG. 3 is plan view of the tool.

In the use of the bead breaker, the rim hooks 34 and 36 are engaged with the edge of the tire rim 16, between the rim edge and the tire side wall, as illustrated in FIG. 1. The push rod head is similarly located, between the rim hooks. The main body 28 of the bead breaker is then brought down into engagement with the wheel centre flange 18 as illustrated in FIG. 1 and the retainer plate 44 is inserted between the edge of the wheel rim 16 and the keeper 40. The convex edge 46 of the retainer plate engages the inner, concave face of the wheel rim to hold the rim in engagement with the two rim hooks 34 and 36. The main body 28 is then held down against the wheel centre flange and the bolt 64 is threaded into the nut 62 to drive the push rod head 56 against the tire bead, thus dislodging it from the tire rim.

Because the fulcrum point of the main body is spaced a considerable distance from the wheel rim, there is only a very small bending moment is applied to the rim. The force applied is distributed over a wide area of the rim using the broad rim hooks and the retainer plate, so that the chances of applying an excessive force to the wheel rim that would cause distortion are minimized.

While one embodiment of the present invention has been described in the foregoing, it is to be understood that other embodiments are possible within the scope of the invention. The invention is to be considered limited solely by the scope of the appended claims.

I claim:

1. A tire bead breaker for a pneumatic tire mounted on a wheel having a rim and a center flange, the breaker comprising:

a main body having a center flange engaging part and an operating part spaced therefrom;

rim hook means secured to the operating part of the main body and projecting therefrom, the rim hook means having a concave channel shape opening towards the center flange engaging of the main body for engagement over an outer side of an edge of the wheel rim;

retainer seat means secured to the main body and having a concave shape opening towards and confronting the rim hook means;

retainer plate means engageable with the retainer seat means, between the retainer seat means and the rim hook means for direct engagement with an inner side of the edge of the wheel rim for retaining the outer side of the wheel rim edge in engagement with the rim hook means;

push rod means mounted slideably on the main body for movement into engagement with a side wall of the tire adjacent the rim hook means; and push rod advancing means for advancing the push rod means into forcible engagement with a side wall of the tire to push the side wall away from the wheel rim.

2. A bead breaker according to claim 1 wherein the main body comprises an elongate member extending from the rim hook means for engagement with the wheel center flange.

3. A bead breaker according to claim 2 wherein the rim hook means project from one end of the elongate member.

4. A bead breaker according to claim 2 wherein the rim hook means and the retainer seat means define a channel therebetween for receiving the retainer plate means.

5. A tire bead breaker for a pneumatic tire mounted on a wheel having a rim and a center flange, the breaker comprising:

a main body having a center flange engaging part and an operating part spaced therefrom;

rim hook means secured to the operating part of the main body and projecting therefrom for engagement with an edge of the wheel rim;

retainer seat means secured to the main body and confronting the rim hook means the retainer seat means and the rim hook means defining a channel therebetween;

retainer plate means engageable in the channel between the retainer seat means and the rim hook means for retaining the wheel rim edge in engagement with the rim hook means, the retainer plate means comprising a plate having a convex edge engageable with a concave face of the wheel rim and an edge opposite the convex edge engageable with the retainer seat means;

push rod means mounted slideably on the main body for movement into engagement with a side wall of the tire adjacent the rim hook means; and push rod advancing means for advancing the push rod means into forcible engagement with a side wall of the tire to push the side wall away from the wheel rim.

6. A bead breaker according to claim 3 wherein the push rod means comprises a pusher head moveable between the rim hooks.

7. A bead breaker according to claim 6 wherein the head has a convex end face.

8. A bead breaker according to claim 7 wherein the pusher head has a curved, spatulate configuration.

9. A bead breaker according to claim 1 including a push rod sleeve mounted on the main body, the push rod means comprising a push rod engaging slideably in the sleeve.

10. A bead breaker according to claim 9 wherein the push rod advancing means comprise a bolt engaging an end of the push rod in the push rod sleeve and a nut into which the bolt is threaded, the nut being secured to the sleeve.

11. A bead breaker according to claim 4 wherein the retainer plate means comprise a plate having a convex edge engageable with a convex face of the wheel rim and an edge opposite the convex edge engageable with the retainer seat means.

* * * * *